(12) United States Patent
Chen et al.

(10) Patent No.: US 11,187,851 B2
(45) Date of Patent: Nov. 30, 2021

(54) DISPLAY DEVICES

(71) Applicant: InnoLux Corporation, Miao-Li County (TW)

(72) Inventors: Chien-Chih Chen, Miao-Li County (TW); Chia-Chun Yang, Miao-Li County (TW); Chin-Cheng Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/737,511

(22) Filed: Jan. 8, 2020

(65) Prior Publication Data
US 2020/0233138 A1  Jul. 23, 2020

(30) Foreign Application Priority Data

Jan. 21, 2019  (CN) .......................... 201910053574.8

(51) Int. Cl.
*F21V 8/00* (2006.01)
*H05K 5/00* (2006.01)

(52) U.S. Cl.
CPC ........... *G02B 6/009* (2013.01); *H05K 5/0017* (2013.01)

(58) Field of Classification Search
CPC .... G02B 6/009; H05K 5/0017; G02F 2202/28
See application file for complete search history.

(56) References Cited

U.S. PATENT DOCUMENTS

| 6,285,420 | B1* | 9/2001 | Mizumo | G02B 6/0056 349/65 |
| 8,411,229 | B2 | 4/2013 | Choo et al. | |
| 8,502,933 | B2* | 8/2013 | Park | G02B 6/0083 349/58 |
| 2010/0165231 | A1* | 7/2010 | Ho | G09F 13/04 349/58 |
| 2013/0033660 | A1* | 2/2013 | Choi | G02B 6/0091 349/64 |
| 2015/0338048 | A1* | 11/2015 | Ahn | G02B 6/0068 362/511 |
| 2017/0336550 | A1* | 11/2017 | Huang | G02B 6/0065 |
| 2018/0113335 | A1* | 4/2018 | Jin | G02F 1/13394 |

(Continued)

FOREIGN PATENT DOCUMENTS

CN  101354497 A  1/2009
CN  102819986 A  12/2012
(Continued)

OTHER PUBLICATIONS

Chinese language office action dated Jul. 26, 2021, issued in application No. CN 201910053574.8.

*Primary Examiner* — Evan P Dzierzynski
(74) *Attorney, Agent, or Firm* — McClure, Qualey & Rodack, LLP (57) ABSTRACT

A display device is provided. The display device includes a display panel that has a polarizer, a light source assembly, a first spacer, and a second spacer. The first spacer is disposed on the first side of the display panel near the light source assembly. The first spacer is located between the display panel and the light source assembly. The second spacer is disposed on the second side of the display panel, away from the light source assembly. The thickness of the first spacer is different than that of the second spacer.

16 Claims, 5 Drawing Sheets

(56) References Cited

U.S. PATENT DOCUMENTS

| | | | | |
|---|---|---|---|---|
| 2018/0143471 | A1* | 5/2018 | Park | G02F 1/134309 |
| 2019/0094456 | A1* | 3/2019 | Lee | G02B 6/0085 |
| 2019/0219871 | A1* | 7/2019 | Kawahira | G02B 5/30 |
| 2020/0096813 | A1* | 3/2020 | Huang | G02F 1/133512 |

FOREIGN PATENT DOCUMENTS

| | | |
|---|---|---|
| CN | 205210467 U | 5/2016 |
| CN | 107219656 A | 9/2017 |

* cited by examiner

DISPLAY DEVICES

CROSS REFERENCE TO RELATED APPLICATIONS

This application claims priority of China Patent Application No. 201910053574.8, filed on Jan. 21, 2019, the entirety of which is incorporated by reference herein.

TECHNICAL FIELD

The present disclosure relates to a display device, and more particularly to a display device with spacers disposed between a display panel and a light source assembly.

BACKGROUND

In current display devices, a plastic member is disposed between a display panel and a light source assembly, for fixing multiple films in the device and loading the display panel above.

Since the plastic member increases the cost and number of steps required in the manufacturing process, a display device should be developed that does not need to be provided with a conventional plastic member between the display panel and the light source assembly.

SUMMARY

In accordance with an embodiment of the present disclosure, a display device is provided. The display device includes a display panel including a polarizer, a light source assembly, a first spacer, and a second spacer. The first spacer is disposed on the first side of the display panel near the light source assembly. The first spacer is located between the display panel and the light source assembly. The second spacer is disposed on the second side of the display panel, away from the light source assembly. The thickness of the first spacer is different than that of the second spacer.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

Although the terms "first", "second", etc. may be used to describe various layers and steps, these features should not be limited by these designations, since such designations are only being used to distinguish one feature from another. It should be understood that the skilled person would appreciate that any combination of steps or features can be combined in any of the embodiments described below to reach the desired effects of this disclosure.

As used in the different embodiments of the present disclosure, the term "over" or "on" broadly encompasses a layer being "directly on or over," e.g., contacting, or "indirectly on or over," e.g., not contacting, another layer. Also, unless otherwise specified, the term "under" broadly encompasses "directly under" and "indirectly under."

In the specification, the terms "about", "approximately" etc. generally mean a given value or within 20% of the range, or within 10%, or within 5%, or within 3%, or within 2%, or within 1%, or within 0.5%. The quantity given here is an approximate quantity, that is, in the absence of specific instructions "about", "approximately" etc., the meanings of "about", "approximately" etc. may still be implied.

The following is an exemplary embodiment of the disclosure, but the disclosure is not limited thereto, and the disclosure may be combined with other known structures to form another embodiment.

Figure 1:
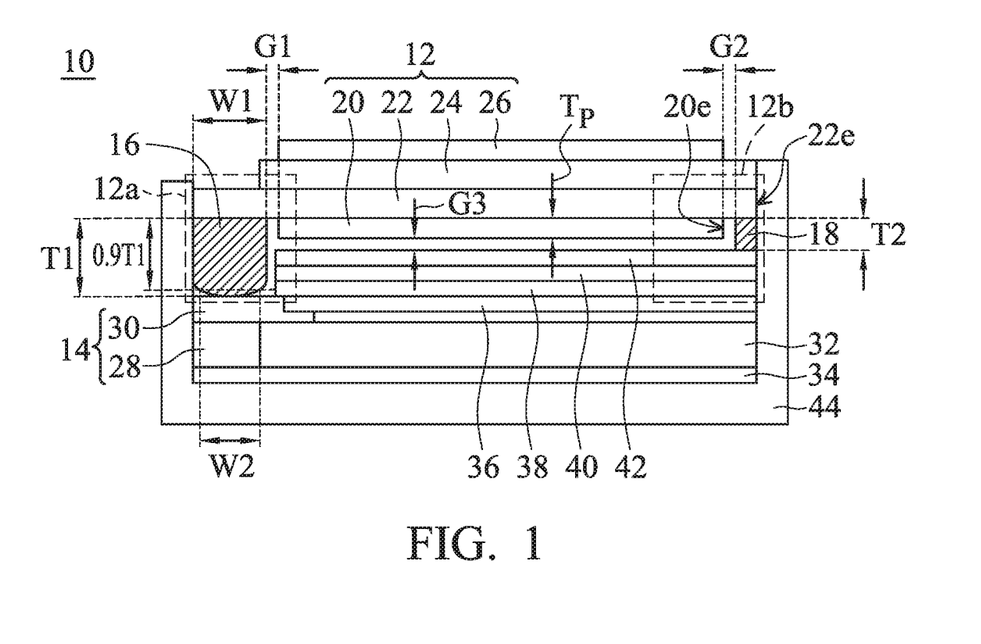
FIG. 1 is a cross-sectional view illustrating a display device according to an embodiment of the disclosure.
Figure 2:
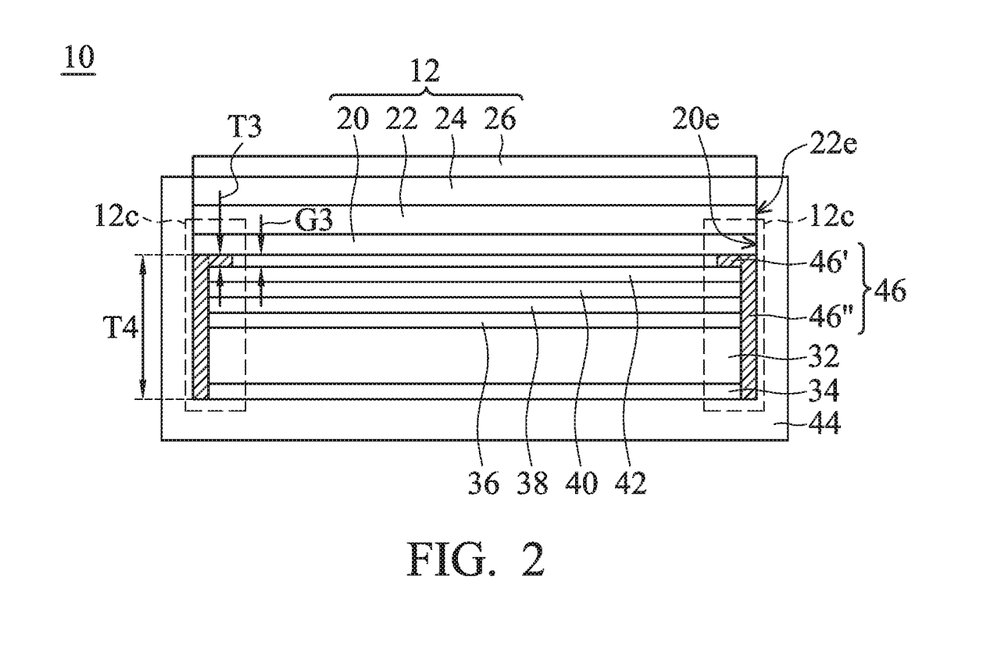
FIG. 2 is a cross-sectional view illustrating a display device according to an embodiment of the disclosure.

Referring to FIGS. 1 and 2, in accordance with one embodiment of the disclosure, a display device 10 is provided. FIGS. 1 and 2 are cross-sectional views of the display device 10 taken along various cross-sectional lines.

Referring to FIG. 1, FIG. 1 is a cross-sectional view taken along a cross-sectional line which is perpendicular to the first side 12a or the second side 12b of the display panel 12. In this embodiment, the first side 12a is a side of the display panel 12 adjacent to the light source assembly 14, and the second side 12b is a side of the display panel 12 away from the light source assembly 14 and opposite the first side 12a. According to FIG. 1, the display device 10 includes a display panel 12, a light source assembly 14, a first spacer 16 and a second spacer 18. The display panel 12 includes a lower polarizer 20, a thin film substrate 22, a color filter 24 and an upper polarizer 26. The lower polarizer 20 is adjacent to the thin film substrate 22. The light source assembly 14 includes a light source 28 and a flexible printed circuit board 30 disposed on the light source 28. The first spacer 16 is disposed on the first side 12a and located between the display panel 12 and the light source assembly 14. The second spacer 18 is disposed on the second side 12b.

In this embodiment, the light source 28 of the light source assembly 14 may include light-emitting diode (LED), but the disclosure is not limited thereto. In other embodiments, the light source 28 of the light source assembly 14 may include lamp, bulb, organic light-emitting diode (OLED), quantum dot (QD), quantum-dot light-emitting diode (QLED or QDLED), fluorescence material, phosphor material, light-emitting diode (LED), micro light-emitting diode or mini light-emitting diode, other luminescent material or a combination of the above-mentioned materials.

In some embodiments, the first spacer 16 may be integrally formed. In some embodiments, the material used for the first spacer 16 is a single material, and in some embodiments, the material used for the first spacer 16 is in the form of a mixture, such as a particle-doped colloid. In some embodiments, the first spacer 16 may be a single-layered or a multi-layered structure including the same or different materials. In some embodiments, the material of the first spacer 16 may include ultraviolet (UV) curable resin glue having a light-shielding effect, and that material may be opaque (for example, black) such as acrylic resin or epoxy resin, but the disclosure is not limited thereto. In some embodiments, the optical density (OD) of the first spacer 16 is approximately between 0.5 and 1.5 (0.5≤optical density≤1.5). In some embodiments, the optical density of the first spacer 16 is approximately between 0.7 and 1.3 (0.7≤optical density≤1.3). In some embodiments, the hardness (shore hardness A) of the first spacer 16 is between 40 and 80 (40≤shore hardness A≤80). In some embodiments, the hardness (shore hardness A) of the first spacer 16 is between 50 and 70 (50≤shore hardness A≤70). In some embodiments, the thickness T1 of the first spacer 16 is approximately between 300 μm and 500 μm (300 μm≤thickness T1≤500 μm). In some embodiments, the thickness T1 of the first spacer 16 is approximately between 350 μm and 450 μm (350 μm≤thickness T1≤450 μm).

In the embodiment of FIG. 1, the material of the second spacer 18 may have the same properties as the first spacer 16, and details are not described herein again. In FIG. 1, the thickness T1 of the first spacer 16 is different than the thickness T2 of the second spacer 18, for example, the thickness T1 of the first spacer 16 is greater than the thickness T2 of the second spacer 18. In some embodiments, the thickness T2 of the second spacer 18 is approximately between zero and 350 μm (zero≤thickness T2≤350 μm). In some embodiments, the thickness T2 of the second spacer 18 is approximately between 100 μm and 300 μm (100 μm≤thickness T2≤300 μm). In FIG. 1, the thickness T1 of the first spacer 16 is the maximum height of the first spacer 16 measured in the normal direction of the lower surface of the thin film substrate 22. Similarly, the thickness T2 of the second spacer 18 is the maximum height of the second spacer 18 measured in the normal direction of the lower surface of the thin film substrate 22.

In FIG. 1, a light guide plate 32 is disposed on one side of the light source 28 in the light source assembly 14, and a reflection sheet 34 is disposed under the light source 28 and the light guide plate 32. In addition, one or more optical films are disposed between the light guide plate 32 and the display panel 12. For example, in this embodiment, the optical films includes a lower diffusion sheet 36, a lower prism sheet 38, an upper prism sheet 40 and an upper diffusion sheet 42, but the disclosure is not limited thereto. In the disclosure, the types and numbers of the optical films between the light guide plate 32 and the display panel 12 may be altered according to actual needs, for example, reducing a prism sheet or a diffusion sheet, or altering a prism sheet to a non-prism-form brightness enhancement film. In FIG. 1, one end of the first spacer 16 is in substantial contact with the thin film substrate 22 in the display panel 12. The other end of the first spacer 16 is in substantial contact with the flexible printed circuit board 30 in the light source assembly 14. There is a gap G1 between the first spacer 16 and the lower polarizer 20 in the display panel 12. In some embodiments, since the outer shape of the first spacer 16 has a curved profile, the width W1 of the side where the first spacer 16 is in contact with the thin film substrate 22 is greater than the width W2 of the other side of the first spacer 16. Here, the width W2 may be defined as the width where the first spacer 16 extends downward from the lower surface of the thin film substrate 22 to 90% (0.9T1) of the thickness T1 of the first spacer 16. In some embodiments, the gap G1 between the first spacer 16 and the lower polarizer 20 is approximately between zero and 350 μm (zero≤gap G1≤350 μm). In some embodiments, the gap G1 between the first spacer 16 and the lower polarizer 20 is approximately between 100 μm and 300 μm (100 μm≤gap G1≤300 μm). In some embodiments, the width W1 of the first spacer 16 in substantial contact with the thin film substrate 22 is approximately between 1 mm and 4.5 mm (1 mm≤width W1≤4.5 mm). In some embodiments, the width W2 of the first spacer 16 at 90% of the thickness T1 is approximately between 0.8 mm and 3.6 mm (0.8 mm≤width W2≤3.6 mm). In FIG. 1, one end of the second spacer 18 is in substantial contact with the thin film substrate 22 in the display panel 12. The other end of the second spacer 18 is in substantial contact with the optical film. Since the edge 20e of the lower polarizer 20 is retracted in the second side 12b and is not flush with the edge 22e of the thin film substrate 22 (the lower polarizer 20 is smaller than the thin film substrate 22), there is a gap G2 between the second spacer 18 and the lower polarizer 20 in the display panel 12. In some embodiments, the gap G2 between the second spacer 18 and the lower polarizer 20 is approximately between zero and 350 μm (zero≤gap G2≤350 μm). In some embodiments, the gap G2 between the second spacer 18 and the lower polarizer 20 is approximately between 100 μm and 300 μm (100 μm≤gap G2≤300 μm). Since the second spacer 18 is disposed between the thin film substrate 22 in the display panel 12 and the optical film, and the thickness T2 of the second spacer 18 is greater than the thickness $T_P$ of the lower polarizer 20, there is a gap G3 between the lower polarizer 20 and the optical film. In some embodiments, the gap G3 between the lower polarizer 20 and the optical film is approximately between zero and 200 μm (zero≤gap G3≤200 μm). In some embodiments, the gap G3 between the lower polarizer 20 and the optical film is approximately between 30 μm and 100 μm (30 μm≤gap G3≤100 μm). In FIG. 1, a back plate 44 is disposed on the outer side of the above components, and is in contact with a part of the components.

Referring to FIG. 2, FIG. 2 is a cross-sectional view taken along a cross-sectional line which is perpendicular to the third side (e.g., left side and right side) of the display panel 12. The third side 12c is adjacent to the first side 12a and the second side 12b. According to FIG. 2, a third spacer 46 is disposed on the third side 12c. In some embodiments, the third spacer 46 may include a plastic frame. The third spacer 46 further includes an extending portion 46' between the display panel 12 and the optical film. In FIG. 2, since the edge 20e of the lower polarizer 20 is flush with the edge 22e of the thin film substrate 22, the extending portion 46' of the third spacer 46 is located between the lower polarizer 20 in the display panel 12 and the optical film. In this embodiment, the thickness T1 of the first spacer 16 is different than the thickness T3 of the extending portion 46' of the third spacer 46, for example, the thickness T1 of the first spacer 16 is greater than the thickness T3 of the extending portion 46' of the third spacer 46, and the thickness T1 of the first spacer 16 is smaller than the thickness T4 of the third spacer 46. In this embodiment, the thickness T3 of the extending portion 46' of the third spacer 46 is the maximum height of the extending portion 46' of the third spacer 46 measured in the normal direction of the lower surface of the thin film substrate 22. The thickness T4 of the third spacer 46 is the maximum height of the third spacer 46 measured in the normal direction of the lower surface of the thin film substrate 22. In FIG. 2, the extending portion 46' of the third spacer 46 is at least partially in substantial contact with the lower polarizer 20 in the display panel 12 and in substantial contact with the optical film, respectively. Therefore, the thickness T3 of the extending portion 46' of the third spacer 46 and the gap G3 between the lower polarizer 20 and the optical film are substantially the same. In some embodiments, the thickness T3 of the extending portion 46' of the third spacer 46 is smaller than the gap G3 between the lower polarizer 20 and the optical film. At this time, there is a gap (not shown) between the optical film and the extending portion 46' of the third spacer 46. When the optical film is thermally expanded, the gap can reduce the probability of affecting image quality caused by warpage of the optical film.

When the display device 10 maintains the component architecture shown in FIG. 1 on the first side 12a and the second side 12b, the display device 10 may have different component architecture designs on the third side 12c. For example, when the display device 10 maintains the component architecture shown in FIG. 1 on the first side 12a and the second side 12b, the edge 20e of the lower polarizer 20 in the third side 12c is flush with the edge 22e of the thin film substrate 22, and the third spacer 46 is disposed between the lower polarizer 20 of the display panel 12 and the optical film. The material of the third spacer 46 includes ultraviolet (UV) curable resin glue having a light-shielding effect, and that material may be opaque (for example, black) such as acrylic resin or epoxy resin, but the disclosure is not limited thereto.

In some embodiments, when the display device 10 maintains the component architecture shown in FIG. 1 on the first side 12a and the second side 12b, the edge 20e of the lower polarizer 20 is retracted in the third side 12c and is not flush with the edge 22e of the thin film substrate 22 (the lower polarizer 20 is smaller than the thin film substrate 22). The third spacer 46 may be a plastic frame that includes an extending portion 46', and the extending portion 46' of the third spacer 46 is located between the thin film substrate 22 in the display panel 12 and the optical film.

In some embodiments, when the display device 10 maintains the component architecture shown in FIG. 1 on the first side 12a and the second side 12b, the edge 20e of the lower polarizer 20 is retracted in the third side 12c of the display panel 12 and is not flush with the edge 22e of the thin film substrate 22 (i.e. the lower polarizer 20 is smaller than the thin film substrate 22). The third spacer 46 is disposed between the thin film substrate 22 in the display panel 12 and the optical film. The material of the third spacer 46 includes ultraviolet (UV) curable resin glue having a light-shielding effect, and that material may be opaque (for example, black) such as acrylic resin or epoxy resin, but the disclosure is not limited thereto.

Figure 3:
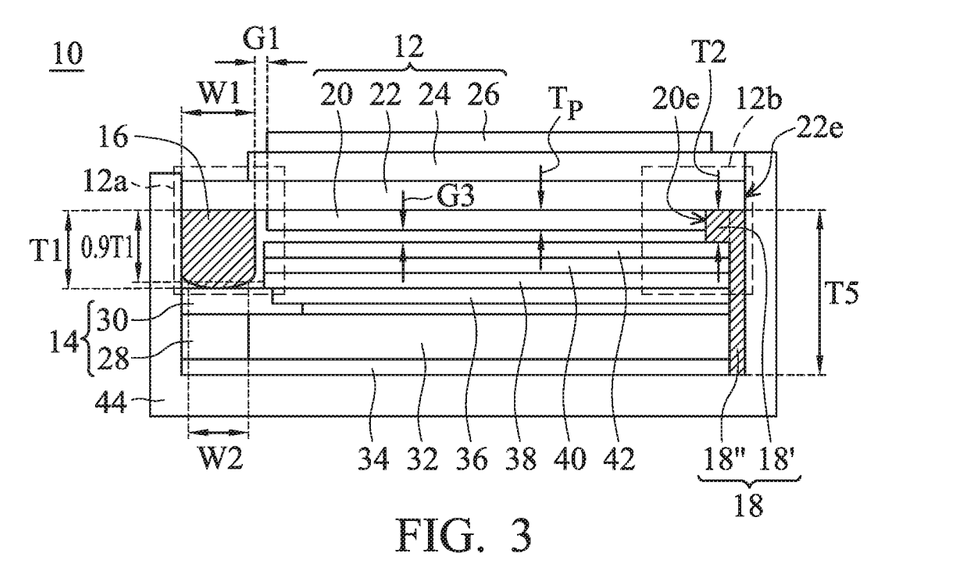
FIG. 3 is a cross-sectional view illustrating a display device according to an embodiment of the disclosure.
Figure 4:
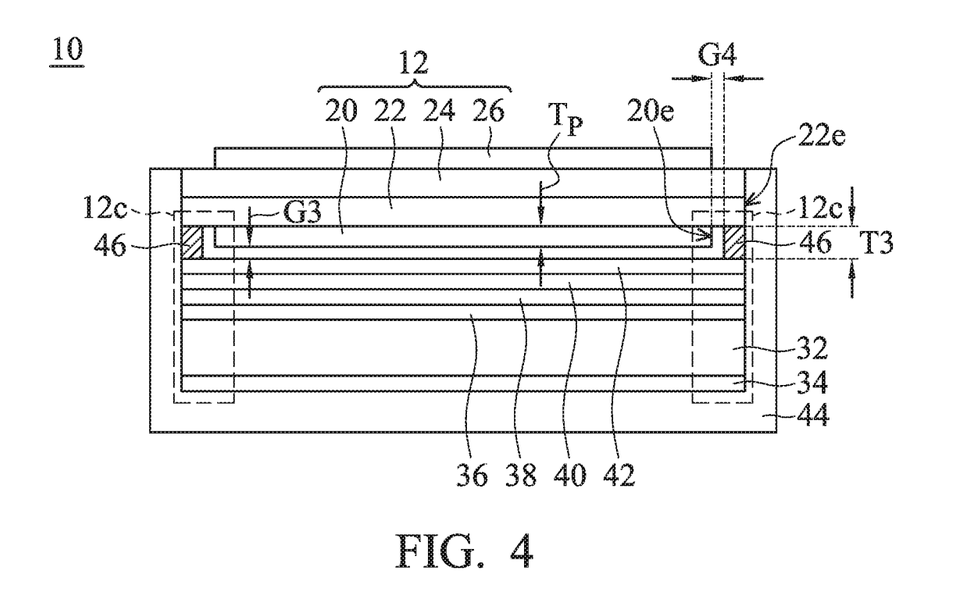
FIG. 4 is a cross-sectional view illustrating a display device according to an embodiment of the disclosure.

Referring to FIGS. 3 and 4, in accordance with one embodiment of the disclosure, a display device 10 is provided. FIGS. 3 and 4 are cross-sectional views of the display device 10 taken along various cross-sectional lines.

Referring to FIG. 3, FIG. 3 is a cross-sectional view taken along a cross-sectional line which is perpendicular to the first side 12a or the second side 12b of the display panel 12. The structure of the display device in FIG. 3 is similar to that of FIG. 1, wherein the position, material properties, and dimensions of the first spacer 16 may be the same as those of the embodiment of FIG. 1, and therefore will not be described again. The difference between this embodiment and the embodiment of FIG. 1 is that in the embodiment shown in FIG. 3, the second spacer 18 may be a plastic frame, and the second spacer 18 may include an extending portion 18'. In FIG. 3, the thickness T1 of the first spacer 16 is different than the thickness T2 of the extending portion 18' of the second spacer 18, for example, the thickness T1 of the first spacer 16 is greater than the thickness T2 of the extending portion 18' of the second spacer 18, and the thickness T1 of the first spacer 16 is smaller than the thickness T5 of the second spacer 18. In this embodiment, the thickness T2 of the extending portion 18' of the second spacer 18 is the maximum height of the extending portion 18' of the second spacer 18 measured in the normal direction of the lower surface of the thin film substrate 22. The thickness T5 of the second spacer 18 is the maximum height of the second spacer 18 measured in the normal direction of the lower surface of the thin film substrate 22.

In the embodiment of FIG. 3, since the edge 20e of the lower polarizer 20 is retracted in the second side 12b and is not flush with the edge 22e of the thin film substrate 22 (the lower polarizer 20 is smaller than the thin film substrate 22), the extending portion 18' of the second spacer 18 is located between the thin film substrate 22 in the display panel 12 and the optical film, and the extending portion 18' of the second spacer 18 is at least partially in substantial contact with the thin film substrate 22 in the display panel 12 and in substantial contact with the optical film, respectively. Therefore, in this embodiment, the thickness T2 of the extending portion 18' of the second spacer 18 is substantially equal to the sum of the thickness $T_P$ of the lower polarizer 20 and the gap G3 between the lower polarizer 20 and the optical film. In other words, the thickness T2 of the extending portion 18' of the second spacer 18 is greater than the thickness $T_P$ of the lower polarizer 20. In some embodiments, the thickness T2 of the extending portion 18' of the second spacer 18 is smaller than the sum of the thickness $T_P$ of the lower polarizer 20 and the gap G3 between the lower polarizer 20 and the optical film. At this time, there is a gap (not shown) between the optical film and the extending portion 18' of the second spacer 18. When the optical film is thermally expanded, the gap can reduce the probability of affecting image quality caused by warpage of the optical film. In FIG. 3, a back plate 44 is disposed on the outer side of the above components, and is in contact with a part of the components.

Referring to FIG. 4, FIG. 4 is a cross-sectional view taken along a cross-sectional line which is perpendicular to the third side 12c of the display panel 12. The third side 12c is adjacent to the first side 12a and the second side 12b. According to FIG. 4, a third spacer 46 is disposed on the third side 12c. In FIG. 4, since the edge 20e of the lower polarizer 20 is retracted in the third side 12c of the display panel 12 and is not flush with the edge 22e of the thin film substrate 22 (the lower polarizer 20 is smaller than the thin film substrate 22), the third spacer 46 is disposed between the thin film substrate 22 in the display panel 12 and the optical film. In this embodiment, the material of the third spacer 46 may be selected from the same type as the first spacer 16, and will not be described herein. In this embodiment, the thickness T1 of the first spacer 16 is different than the thickness T3 of the third spacer 46, for example, the thickness T1 of the first spacer 16 is greater than the thickness T3 of the third spacer 46. In this embodiment, since the third spacer 46 is in substantial contact with the thin film substrate 22 in the display panel 12 and in substantial contact with the optical film respectively, and the thickness T3 of the third spacer 46 is greater than the thickness $T_P$ of the lower polarizer 20, there is a gap G3 between the lower polarizer 20 and the optical film. More specifically, the thickness T3 of the third spacer 46 is substantially equal to the sum of the thickness $T_P$ of the lower polarizer 20 and the gap G3. In FIG. 4, there is a gap G4 between the third spacer 46 and the lower polarizer 20 in the display panel 12. In some embodiments, the gap G4 between the third spacer 46 and the lower polarizer 20 is approximately between zero and 350 μm (zero≤gap G4≤350 μm). In some embodiments, the gap G4 between the third spacer 46 and the lower polarizer 20 is approximately between 100 μm and 300 μm (100 μm≤gap G4≤300 μm).

In some embodiments, when the display device 10 maintains the component architecture shown in FIG. 3 on the first side 12a and the second side 12b, the display device 10 may have different component architecture designs on the third side 12c. For example, in some embodiments, when the display device 10 maintains the component architecture shown in FIG. 3 on the first side 12a and the second side 12b of the display panel 12, the edge 20e of the lower polarizer 20 is retracted in the third side 12c and is not flush with the edge 22e of the thin film substrate 22 (the lower polarizer 20 is smaller than the thin film substrate 22). The third spacer 46 may be a plastic frame and include an extending portion 46' located between the thin film substrate 22 in the display panel 12 and the optical film.

In some embodiments, when the display device 10 maintains the component architecture shown in FIG. 3 on the first side 12a and the second side 12b, the edge 20e of the lower polarizer 20 in the third side 12c of the display panel 12 is flush with the edge 22e of the thin film substrate 22, and the third spacer 46 is disposed between the lower polarizer 20 of the display panel 12 and the optical film. The material of the third spacer 46 includes ultraviolet (UV) curable resin glue having a light-shielding effect, and that material may be opaque (for example, black) such as acrylic resin or epoxy resin, but the disclosure is not limited thereto.

In some embodiments, when the display device 10 maintains the component architecture shown in FIG. 3 on the first side 12a and the second side 12b, the edge 20e of the lower polarizer 20 in the third side 12c is flush with the edge 22e of the thin film substrate 22. The third spacer 46 may be a plastic frame and further include an extending portion 46' located between the lower polarizer 20 in the display panel 12 and the optical film.

Figure 5:
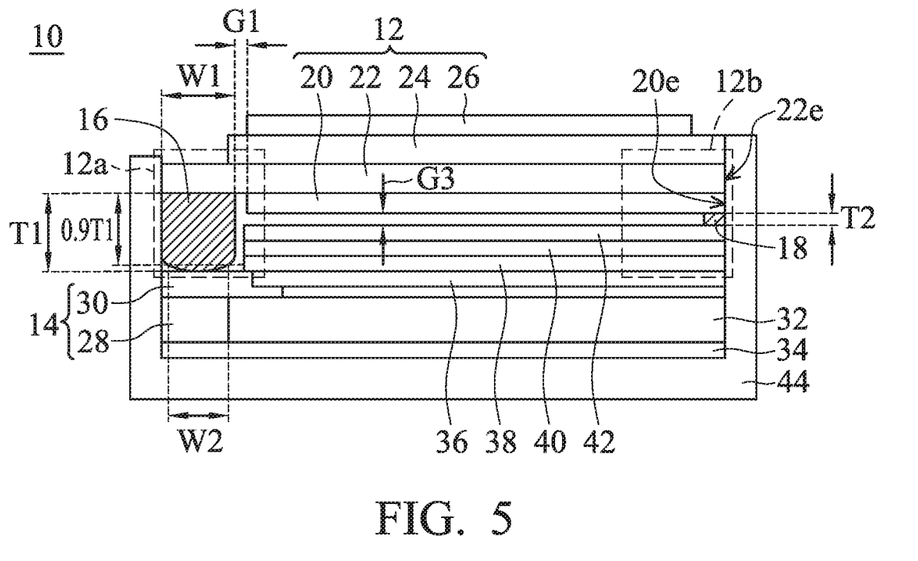
FIG. 5 is a cross-sectional view illustrating a display device according to an embodiment of the disclosure.
Figure 6:
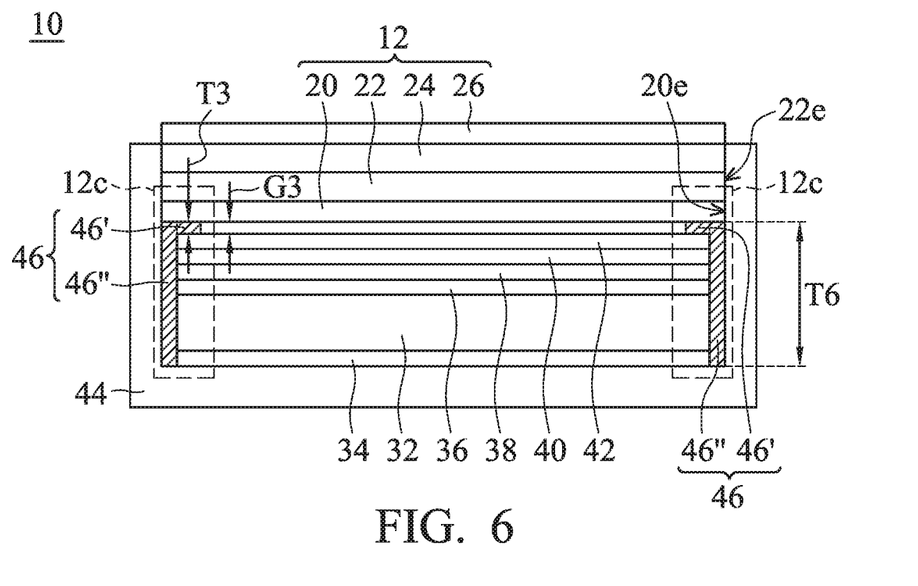
FIG. 6 is a cross-sectional view illustrating a display device according to an embodiment of the disclosure.

Referring to FIGS. 5 and 6, in accordance with one embodiment of the disclosure, a display device 10 is provided. FIGS. 5 and 6 are cross-sectional views of the display device 10 taken along various cross-sectional lines.

Referring to FIG. 5, FIG. 5 is a cross-sectional view taken along a cross-sectional line which is perpendicular to the first side 12a or the second side 12b of the display panel 12. The structure of the display device in FIG. 5 is similar to that of FIG. 1, wherein the position, material properties, and dimensions of the first spacer 16 may be the same as those of the embodiment of FIG. 1, and therefore will not be described again. In this embodiment, the position and material properties of the second spacer 18 may be the same as those of the embodiment of FIG. 1, and therefore will not be described again. The difference between this embodiment and the embodiment of FIG. 1 is that, in this embodiment, the edge 20e of the lower polarizer 20 on the second side 12b is flush with the edge 22e of the thin film substrate 22, so that the second spacer 18 is disposed between the lower polarizer 20 in the display panel 12 and the optical film, and both ends of the second spacer 18 are in substantial contact with the lower polarizer 20 in the display panel 12 and in substantial contact with the optical film, respectively. Therefore, the gap G3 between the lower polarizer 20 and the optical film is substantially equal to the thickness T2 of the second spacer 18. The thickness T1 of the first spacer 16 and the thickness T2 of the second spacer 18 are different, for example, the thickness T1 of the first spacer 16 is greater than the thickness T2 of the second spacer 18. In FIG. 5, a back plate 44 is disposed on the outer side of the above components, and is in contact with a part of the components.

Referring to FIG. 6, FIG. 6 is a cross-sectional view taken along a cross-sectional line which is perpendicular to the third side 12c of the display panel 12. The third side 12c is adjacent to the first side 12a and the second side 12b. In the embodiment shown in FIG. 6, the structure of the display device 10 is the same as that of the embodiment shown in FIG. 2, and the position, material properties, dimensions, and changeable form of the third spacer 46 may be the same as those of the embodiment shown in FIG. 2, and therefore will not be described again.

Figure 7:
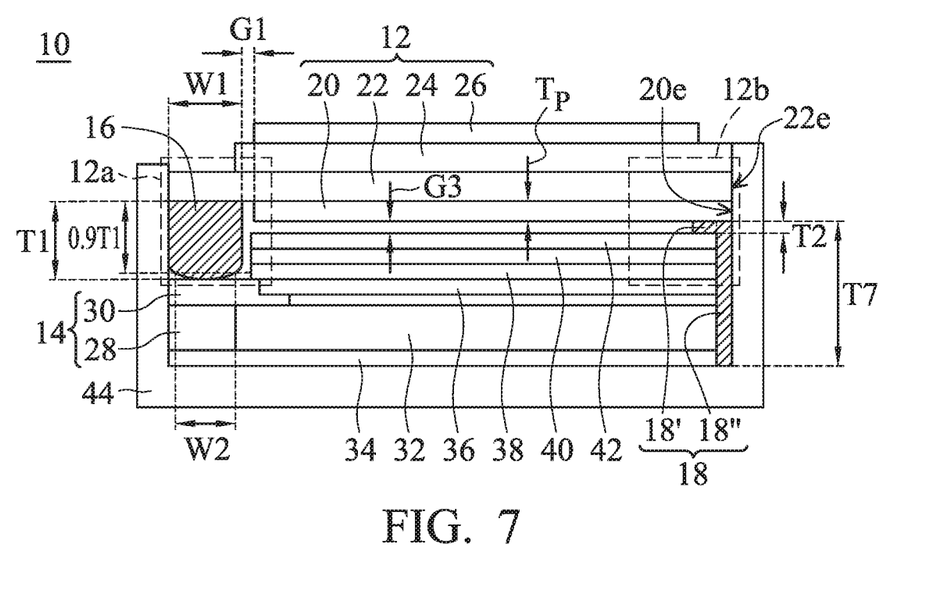
FIG. 7 is a cross-sectional view illustrating a display device according to an embodiment of the disclosure.
Figure 8:
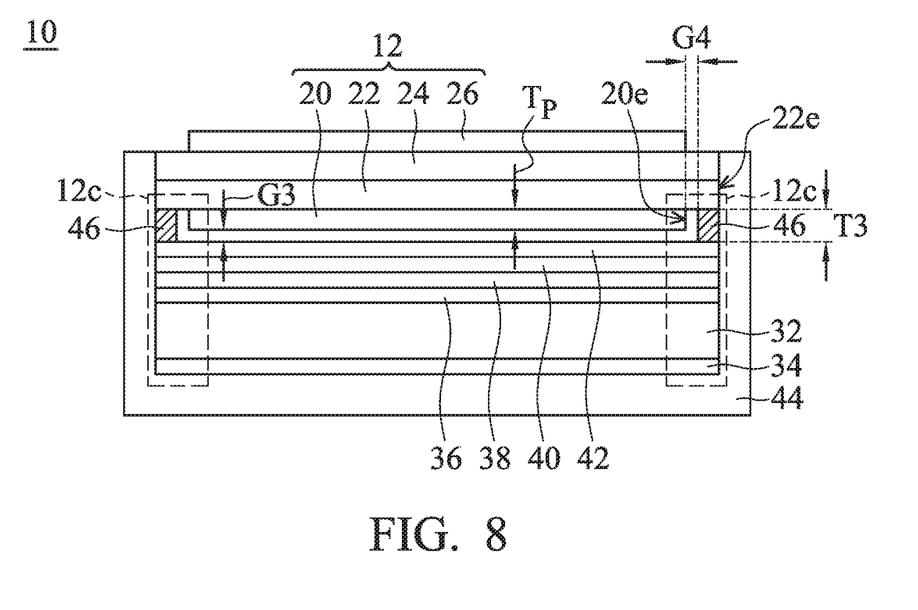
FIG. 8 is a cross-sectional view illustrating a display device according to an embodiment of the disclosure.

Referring to FIGS. 7 and 8, in accordance with one embodiment of the disclosure, a display device 10 is provided. FIGS. 7 and 8 are cross-sectional views of the display device 10 taken along various cross-sectional lines.

Referring to FIG. 7, FIG. 7 is a cross-sectional view taken along a cross-sectional line which is perpendicular to the first side 12a or the second side 12b of the display panel 12. The structure of the display device in FIG. 7 is similar to that of FIG. 3, wherein the position, material properties, and dimensions of the first spacer 16 may be the same as those of the embodiment of FIG. 3, and therefore will not be described again. In addition. In this embodiment, the position and material properties of the second spacer 18 may be the same as those of the embodiment of FIG. 3, and therefore will not be described again. The difference between this embodiment and the embodiment of FIG. 3 is that, in this embodiment, the edge 20e of the lower polarizer 20 on the second side 12b is flush with the edge 22e of the thin film substrate 22, so that the extending portion 18' of the second spacer 18 is located between the lower polarizer 20 in the display panel 12 and the optical film, and there is a gap G3 between the lower polarizer 20 and the upper diffusion sheet 42. In this embodiment, the extending portion 18' of the second spacer 18 is at least partially in substantial contact with the lower polarizer 20 in the display panel 12 and in substantial contact with the optical film, respectively. Therefore, the gap G3 between the lower polarizer 20 and the optical film is substantially the same as the thickness T2 of the extending portion 18' of the second spacer 18. In some embodiments, the thickness T2 of the extending portion 18' of the second spacer 18 is smaller than the gap G3 between the lower polarizer 20 and the optical film. At this time, there is a gap (not shown) between the optical film and the extending portion 18' of the second spacer 18. When the optical film is thermally expanded, the gap can reduce the probability of affecting image quality caused by warpage of the optical film. In FIG. 7, a back plate 44 is disposed on the outer side of the above components, and is in contact with a part of the components.

In FIG. 7, the thickness T1 of the first spacer 16 is different than the thickness T2 of the extending portion 18' of the second spacer 18, for example, the thickness T1 of the first spacer 16 is greater than the thickness T2 of the extending portion 18' of the second spacer 18, and the thickness T1 of the first spacer 16 is smaller than the thickness T7 of the second spacer 18. In this embodiment, the thickness T2 of the extending portion 18' of the second spacer 18 is the maximum height of the extending portion 18' of the second spacer 18 measured in the normal direction of the lower surface of the thin film substrate 22. The thickness T7 of the second spacer 18 is the maximum height of the second spacer 18 measured in the normal direction of the lower surface of the thin film substrate 22.

Referring to FIG. 8, FIG. 8 is a cross-sectional view taken along a cross-sectional line which is perpendicular to the third side 12c of the display panel 12. The third side 12c is adjacent to the first side 12a and the second side 12b. According to FIG. 8, the structure of the display device 10 is the same as that of the embodiment shown in FIG. 4, and the position, material properties, dimensions, and changeable form of the third spacer 46 may be the same as those of the embodiment shown in FIG. 4, and therefore will not be described again.

Figure 9A:
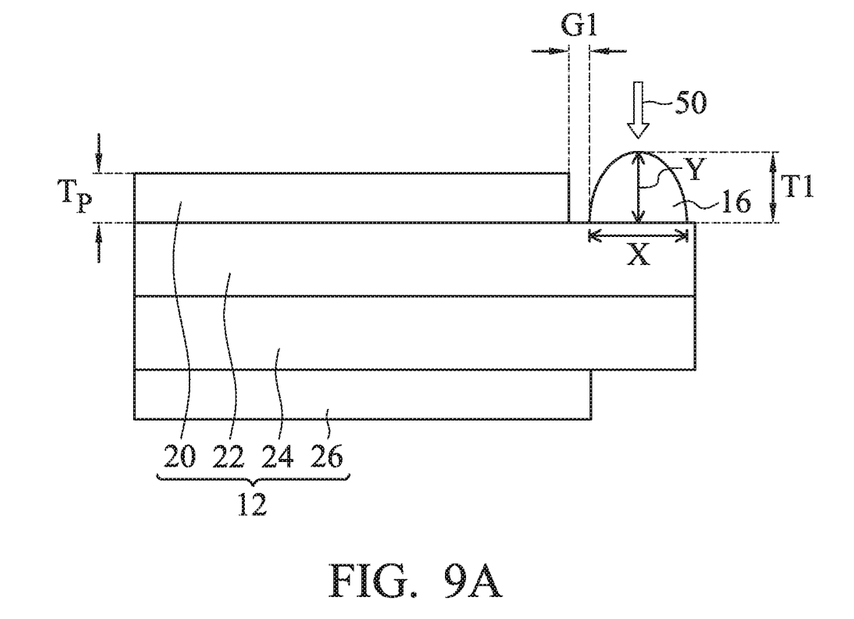
FIGS. 9A and 9B illustrate a method for fabricating a spacer used in a display device according to an embodiment of the disclosure.
Figure 9B:
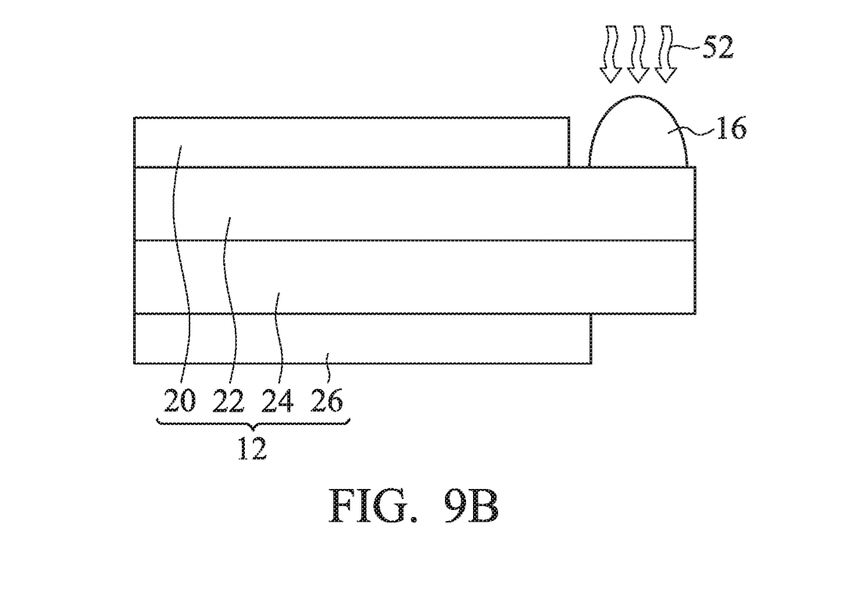

Referring to FIGS. 9A and 9B, in accordance with one embodiment of the disclosure, a method of manufacturing a glue used in a display device is provided. FIGS. 9A and 9B are cross-sectional views of the above manufacturing method.

As shown in FIG. 9A, a display panel 12 is provided. The display panel 12 includes a lower polarizer 20, a thin film substrate 22, a color filter 24 and an upper polarizer 26.

Next, a gluing process 50 is performed. A glue (the first spacer) 16 is applied onto the thin film substrate 22 of the display panel 12. In some embodiments, the glue 16 is applied onto the thin film substrate 22 of the display panel 12 by, for example, an automated gluing process. At this time, the cross-sectional profile of the glue 16 applied onto the thin film substrate 22 of the display panel 12 is curved, as shown in FIG. 9. The thickness T1 of the glue 16 is greater than the thickness $T_P$ of the lower polarizer 20. In some embodiments, the thickness T1 of the glue 16 is approximately between 300 μm and 500 μm (300 μm≤thickness T1≤500 μm). In some embodiments, the thickness T1 of the first spacer 16 is approximately between 350 μm and 450 μm (350 μm≤thickness T1≤450 μm). In some embodiments, the aspect ratio (Y/X) of the semi-elliptical glue 16 is approximately between 0.066 and 0.5 (1 cm≤X≤4.5 cm, 0.3 cm≤Y≤0.5 cm) so that the glue 16 has appropriate stiffness. In some embodiments, the method for optimizing the aspect ratio of the glue 16 includes adding different types and contents of the thixotropic agent to the glue 16. In some embodiments, the thixotropic agent added to the glue 16 includes various suitable polymer materials. In some embodiments, there is a gap G1 between the glue 16 and the lower polarizer 20. In some embodiments, the gap G1 between the glue 16 and the lower polarizer 20 is approximately between zero and 350 μm (zero≤gap G1≤350 μm). In some embodiments, the gap G1 is approximately between 100 μm and 300 μm (100 μm≤gap G1≤300 μm). The material of the glue 16 may include ultraviolet (UV) curable resin glue having a light-shielding effect, and that material may be opaque (for example, black) such as acrylic resin or epoxy resin, but the disclosure is not limited thereto. In the disclosure, various opaque resins which can be cured by ultraviolet light irradiation, heating or other processing methods are suitable as materials for the glue 16. In some embodiments, the optical density (OD) of the glue 16 is approximately between 0.5 and 1.5 (0.5≤optical density≤1.5). In some embodiments, the optical density of the first spacer 16 is approximately between 0.7 and 1.3 (0.7≤optical density≤1.3).

Next, referring to FIG. 9B, an ultraviolet (UV) curing process 52 is performed on the glue 16. In some embodiments, the UV curing process 52 provides an appropriate illumination intensity, between about 200 mW and 2,000 mW (200 mW≤illumination intensity≤2,000 mW), so that the glue 16 has a suitable hardness after illumination. In some embodiments, the UV curing process 52 provides an appropriate illumination time of about 0.5 to 5 seconds (0.5 seconds≤illumination time≤5 seconds), so that the glue 16 has a suitable hardness after illumination. In some embodiments, after illumination, the hardness (shore hardness A) of the glue 16 is between 40 and 80 (40≤shore hardness A≤80). In some embodiments, the hardness (shore hardness A) of the first spacer 16 is between 50 and 70 (50≤shore hardness A≤70). At this point, the fabrication of the glue 16 used in the display device is completed for the subsequent assembly of the display panel and the backlight module.

In the disclosure, the first spacer 16 is disposed on one side of the display panel adjacent to the light source assembly (i.e., between the display panel and the light source assembly), and may be composed of UV curable resin glue. The first spacer 16 may be black and have good light-shielding properties to reduce light leakage. Since the spacer is disposed on one side of the optical films (for example, the lower diffusion sheet, the lower prism sheet, the upper prism sheet and the upper diffusion sheet) in the device, the optical films can thus be effectively fixed to reduce the displacement of the optical films. In addition, since the spacer has a certain height and appropriate hardness, it can be used as a buffer between components, which is advantageous for gap filling and carrying the display panel to reduce the probability of fragmentation. In the disclosure, the traditional plastic parts and tapes used for fixing the optical films and carrying the display panel are replaced by resin glue, which can be incorporated into the automated gluing process, reducing labor and material costs. Furthermore, according to the structure of the display device provided by the disclosure, the opaque flexible printed circuit board (FPC) is disposed on the light-emitting diode (LED), in addition to fix the light guide plate on one side of the light-emitting diode, it is not necessary to provide a reflective sheet under the spacer.

It will be apparent to those skilled in the art that any feature in one embodiment can be applied to another embodiment without departing or contravening the spirit of the disclosure.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:
1. A display device, comprising:
a display panel having a thin film substrate and a lower polarizer adjacent to the thin film substrate;
a light source assembly opposite the display panel;
a first spacer disposed on a first side of the display panel near the light source assembly, the first spacer being located between the thin film substrate and the light source assembly, wherein the first spacer comprises curable resin;
a second spacer disposed on a second side of the display panel away from the light source assembly, wherein the first spacer has a thickness which is different than that of the second spacer, and the thickness of the first spacer is greater than a thickness of the lower polarizer; and
an optical film, wherein the lower polarizer and the second spacer are disposed between the thin film substrate and the optical film.

2. The display device as claimed in claim 1, wherein there is a gap between the first spacer and the lower polarizer.

3. The display device as claimed in claim 1, wherein there is a gap between the second spacer and the lower polarizer.

4. The display device as claimed in claim 1, wherein the second spacer is located between the lower polarizer and the optical film.

5. The display device as claimed in claim 1, wherein the second spacer comprises curable resin or a plastic frame.

6. The display device as claimed in claim 5, wherein the second spacer comprises curable resin, and the thickness of the first spacer is greater than that of the second spacer.

7. The display device as claimed in claim 5, wherein the second spacer comprises a plastic frame, and the thickness of the first spacer is smaller than that of the second spacer.

8. The display device as claimed in claim 1, further comprising a third spacer disposed on a third side of the display panel, wherein the third side is adjacent to the first side and the second side.

9. The display device as claimed in claim 8, wherein the third spacer comprises curable resin or a plastic frame.

10. The display device as claimed in claim 8, wherein the thickness of the first spacer is different than that of the third spacer.

11. The display device as claimed in claim 8, wherein there is a gap between the third spacer and the lower polarizer.

12. The display device as claimed in claim 1, wherein the first spacer has an optical density which is in a range from 0.5 to 1.5.

13. The display device as claimed in claim 12, wherein the first spacer has an optical density which is in a range from 0.7 to 1.3.

14. The display device as claimed in claim 1, wherein the thickness of the first spacer is in a range from 300 µm to 500 µm.

15. The display device as claimed in claim 1, wherein the light source assembly comprises a light source and a flexible printed circuit board disposed on the light source.

16. The display device as claimed in claim 1, wherein the first spacer has a shore hardness which is in a range from 40 to 80.

* * * * *